(12) United States Patent
Blain et al.

(10) Patent No.: US 6,387,462 B1
(45) Date of Patent: May 14, 2002

(54) THERMAL INSULATING DEVICE FOR HIGH TEMPERATURE REACTORS AND FURNACES WHICH UTILIZE HIGHLY ACTIVE CHEMICAL GASES

(75) Inventors: David Paul Blain, Rocky River; Robert Angelo Mercuri, Seven Hills, both of OH (US)

(73) Assignee: UCAR Graph-Tech Inc., Lakewood, OH (US)

( * ) Notice: Subject to any disclaimer, the term of this patent is extended or adjusted under 35 U.S.C. 154(b) by 0 days.

(21) Appl. No.: 09/459,209

(22) Filed: Dec. 10, 1999

(51) Int. Cl.[7] .............................. B32B 1/08; B32B 9/00; B68D 1/08; F16L 9/14
(52) U.S. Cl. .................. 428/36.9; 428/35.7; 428/35.9; 428/36.91; 428/244; 428/280; 428/408; 138/149
(58) Field of Search .................... 428/36, 244, 280, 428/408, 35.7, 35.9, 36.91; 138/149

(56) References Cited

U.S. PATENT DOCUMENTS

| | | | | |
|---|---|---|---|---|
| 3,009,600 A | * | 11/1961 | Matsch | 220/9 |
| 3,404,061 A | | 10/1968 | Shane et al. | 161/125 |
| 4,279,952 A | * | 7/1981 | Kodama et al. | 428/36 |
| 4,888,242 A | * | 12/1989 | Matsuo et al. | 428/408 |
| 4,895,713 A | | 1/1990 | Greinke et al. | 423/448 |
| 4,914,832 A | * | 4/1990 | Cuthbert | 34/9 |
| 5,126,112 A | | 6/1992 | Burgie | 422/241 |
| 5,582,781 A | | 12/1996 | Hayward | 264/28 |
| 5,800,924 A | | 9/1998 | Metter | 428/408 |
| 5,846,459 A | * | 12/1998 | Mercuri | 264/42 |

* cited by examiner

Primary Examiner—Harold Pyon
Assistant Examiner—Marc Patterson
(74) Attorney, Agent, or Firm—James R. Cartiglia

(57) ABSTRACT

Thermal insulating device for high temperature reactors and furnaces utilizing highly active chemical gases in a reducing atmosphere, in the form of a shell of resin bonded flexible graphite sheet.

4 Claims, 4 Drawing Sheets

THERMAL INSULATING DEVICE FOR HIGH TEMPERATURE REACTORS AND FURNACES WHICH UTILIZE HIGHLY ACTIVE CHEMICAL GASES

FIELD OF THE INVENTION

The present invention relates to a thermal insulating device for high temperature reactors and furnaces which utilize highly active chemical gases as reactants. The thermal insulating device includes a shell of resin bonded spiral wound flexible graphite sheet. The device also includes barriers for restriction of thermal transfer.

BACKGROUND OF THE INVENTION

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation. Graphites possess anisotropic structures and thus exhibit or possess many properties which are highly oriented, i.e. directional. Graphites may be characterized as laminated structures of carbon, that is, structures consisting of superposed layers or laminae of carbon atoms joined together by weak van der Waals forces. In considering the graphite structure, two axes or directions are usually noted, i.e. the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. Natural graphites possess a high degree of orientation and hence anisotropy with respect to thermal and electrical conductivity and other properties.

As noted above, the bonding forces holding the parallel layers of carbon atoms together are only weak van der Waals forces. Natural graphites can be treated so that the spacing between the superposed carbon layers or laminae can be appreciably opened up so as to provide a marked expansion in the direction perpendicular to the layers, that is, in the "c" direction and thus form an expanded or intumesced graphite structure in which the laminar character is substantially retained.

Natural graphite flake which has been greatly expanded and more particularly expanded so as to have a final thickness or "c" direction dimension which is at least 80 or more times the original "c" direction dimension can be formed without the use of a binder into cohesive or integrated sheets, e.g. webs, papers, strips, tapes, or the like. The formation of graphite particles which have been expanded to have a final thickness or "c" dimension which is at least 80 times the original "c" direction dimension into integrated sheets without the use of any binding material is believed to be possible due to the excellent mechanical interlocking, or cohesion which is achieved between the voluminously expanded graphite particles.

In addition to flexibility, the sheet material, as noted above, has also been found to possess a high degree of thermal anisotropy. Sheet material can be produced which has excellent flexibility, good strength and is highly resistant to chemical attack and has a high degree of orientation.

Briefly, the process of producing flexible, binderless graphite sheet material comprises compressing or compacting under a predetermined load and in the absence of a binder, expanded graphite particles which have a "c" direction dimension which is at least 80 times that of the original particles so as to form a substantially flat, flexible, integrated graphite sheet. The expanded graphite particles which generally are worm-like or vermiform in appearance, once compressed, will maintain the compression set. The density and thickness of the sheet material can be varied by controlling the degree of compression. The density of the sheet material can be within the range of from about 5 pounds per cubic foot to about 125 pounds per cubic foot. The flexible graphite sheet material exhibits an appreciable degree of anisotropy, with the degree of anisotropy increasing upon roll pressing of the sheet material to increased density. In roll pressed anisotropic sheet material, the thickness, i.e. the direction perpendicular to the sheet surface comprises the "c" direction and the directions ranging along the length and width, i.e. along or parallel to the surfaces comprises the "a" directions.

SUMMARY OF THE INVENTION

The present invention comprises a hollow, self-supporting, cylindrically shaped, vertically extending shell for surrounding a high temperature radiant heat source, e.g. reactors or furnaces in which highly chemically active gases in a reducing atmosphere, are utilized. The hollow shell is used as a heat shield to reflect radiant heat energy back to the reactor and to minimize loss of thermal energy due to conduction. The aforementioned shell is in the form of a spiral wound sheet of anisotropic flexible graphite, formed by roll-pressing and compressing expanded articles of graphite, bonded to an in situ cured phenolic resin coated on both sides of a thin sheet of heat decomposable carbon based material which is co-extensive with the spiral wound sheet of flexible graphite. The thin sheet of heat decomposable carbon based material provides a path for the escape of gases which develop in the course of in situ curing of the phenolic resin; this path, resulting from the aforesaid decomposition, is provided between the sheet of spiral wound flexible graphite and further enables contact between resin applied on both, i.e. the opposite, sides of the sheet of heat decomposable carbon-based material in the course of in situ curing of the phenolic resin. This results in a strong continuous bonding layer of phenolic resin between, and co-extensive with, the spiral wound sheet of flexible graphite. In a further embodiment of the present invention, a second shell essentially identical to the first shell, except for being larger in cross-section, is provided. The second larger shell is positioned to surround the first shell to define an annular chamber therebetween which is filled with individual, uncompressed particles of expanded graphite which essentially fill the annular chamber. The annular chamber can be closed, top and bottom, by sheets of laminated anisotropic flexible graphite resin-bonded to the first and second shells. These will create chambers encapsulating the insulation material. This will have the affect of isolating thermals in specific areas and inhibit transmission over the entire shield.

DETAILED DESCRIPTION OF THE INVENTION

Figure 1:
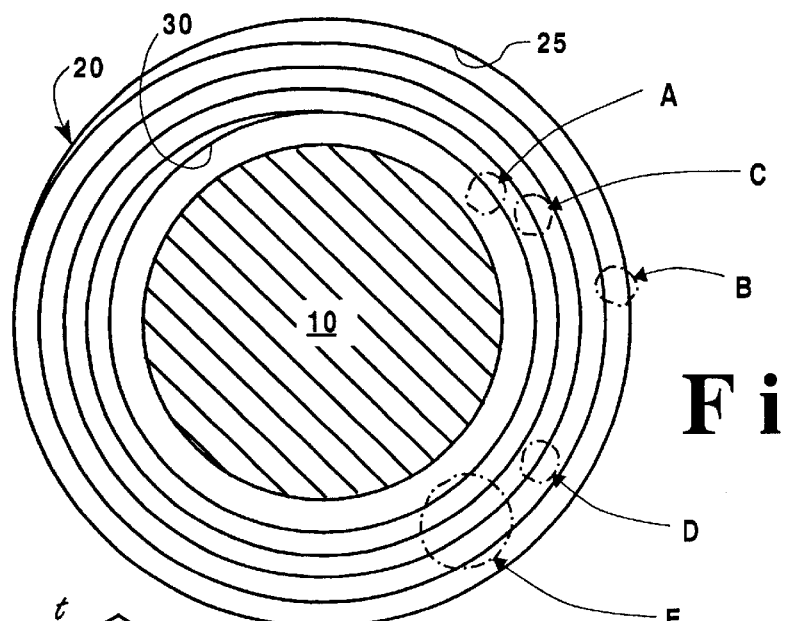
FIG. 1 is a top plan view of a heat shield in accordance with the present invention.

A common method for manufacturing graphite foil from flexible graphite is described by Shane et al in U.S. Pat. No. 3,404,061 the disclosure of which is incorporated herein by reference. In the typical practice of the Shane et al method, natural graphite flakes are intercalated by dispersing the flakes in a solution containing an oxidizing agent of, e.g. a mixture of nitric and sulfuric acid. The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid.

The preferred intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solutions may contain metal halides such as ferric chloride, and ferric chloride mixed with sulfuric acid, or a halide, such as bromine as a solution of bromine and sulfuric acid or bromine in an organic solvent.

After the flakes are intercalated, any excess solution is drained from the flakes. The quantity of intercalation solution retained on the flakes after draining may range from 20 to 150 parts of solution by weight per 100 parts by weight of graphite flakes (pph) and more typically about 50 to 120 pph. Alternatively, the quantity of the intercalation solution may be limited to between 10 to 50 parts of solution per hundred parts of graphite by weight (pph) which permits the washing step to be eliminated as taught and described in U.S. Pat. No. 4,895,713 the disclosure of which is also herein incorporated by reference. The intercalated graphite flakes are exfoliated by exposing them to a flame for only a few seconds at temperature greater than 700° C., more typically 1000° C. or higher. The exfoliated graphite particles, or worms, are then compressed and subsequently roll pressed into a densely compressed flexible graphite sheet of desired density and thickness and substantially increased anisotropy with respect to thermal conductivity and other physical properties. Suitable exfoliation methods and methods for compressing the exfoliated graphite particles into thin foils are disclosed in the aforementioned U.S. Pat. No. 3,404,061 to Shane et al. It is conventional to compress the exfoliated worms in stages with the product of the first or early stages of compression referred to in the art as "flexible graphite mat". The flexible graphite mat is then further compressed by roll pressing into a standard density sheet or foil of preselected thickness. A flexible graphite mat may be thus compressed by roll pressing into a thin sheet or foil of between 2–70 mils in thickness with a density approaching theoretical density, although a density of about 70 lbs./ft.$^3$ is acceptable for most applications.

Roll pressed flexible graphite sheet is known to be a relatively good thermal barrier in the direction ("c" axis) perpendicular to the parallel planar surfaces of the sheet. The thermal conductivity along and parallel to the sheet surfaces ("a" axes) is approximately twenty (20) or more times greater than through its thickness ("c" axis).

Figures 1A, 1B:
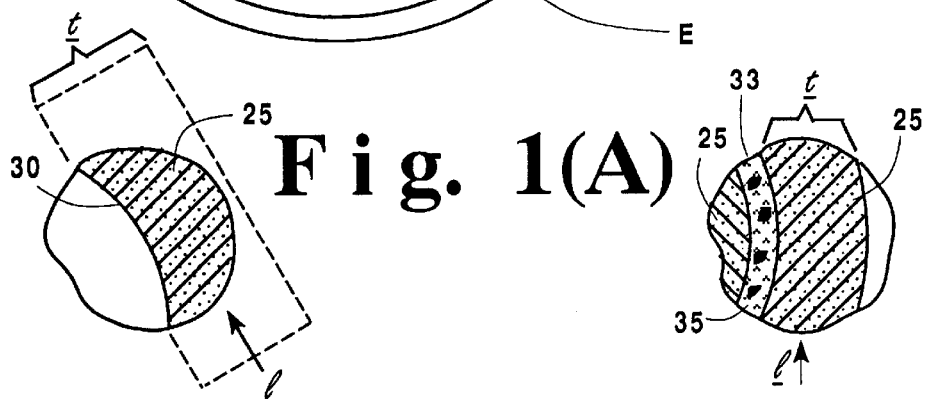
FIGS. 1(A) to 1(E) show enlarged portions of FIG. 1.
Figure 2:
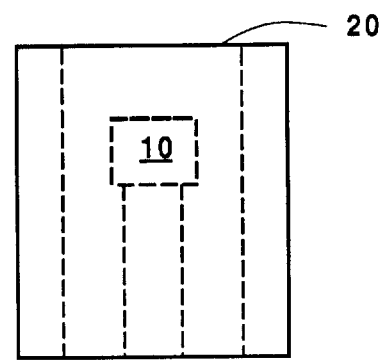
FIG. 2 is a side elevation view of the heat shield of FIG. 1.

With reference to FIG. 1, which is a top plan view, and the side elevation view of FIG. 2, a high temperature reactor is indicated schematically at 10, representing, for example, a reactor which involves the use of chemically active gases and which operates at temperatures of 1000° C. and higher. A heat shielding self-supporting shell is shown at 20. As shown in FIG. 1, the self-supporting shell 20 is formed of a spiral wound sheet 25 of roll-pressed anisotropic flexible graphite. The flexible graphite sheet 25 is suitably from 1 to 100 mm thick and the density of the sheet 25 is suitably from 50 to 90 lbs. per cubic foot. With reference to FIG. 1(A), the transfer of thermal energy through the thickness "t" of the anisotropic flexible graphite sheet 25 (the "c" axis direction) is very much less than in the plane "1" of the flexible graphite sheet 25 (the "a" axes directions). Thus, most of the heat energy radiated from high temperatures heat source reactor 10 (1000° C. and higher) is reflected back to the reactor 10 from the inner surface 30 of shell 20, which is formed of anisotropic flexible graphite sheet. Some of the radiant heat energy from reactor 10 is not reflected back and causes the temperature at locations on the inner surface 30 of shell 20 to rise. Heat at these locations is rapidly transferred and spread by conduction throughout the anisotropic flexible graphite sheet 25 in all directions ("1") of the "a" axes in the plane of flexible graphite sheet 25. Thus, temperature throughout sheet 25 is essentially uniform and the presence of persistent hot spots is avoided. In order to provide the spiral wound sheet with sufficient strength to be self-supporting in rugged high temperature environments, a thin layer of in situ cured phenolic resin, indicated at 33 in FIG. 1, co-extensive with spiral wound sheet of flexible graphite, is used to bond the spiral wound sheets. Within this in situ cured resin are small dispersed trace particles 35 of carbon, shown in FIG. 1(B) resulting from the charring of a heat decomposable phenolic resin supporting substrate during in situ curing of the phenolic resin.

Figure 1C:
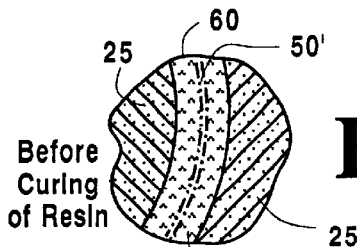
Figure 1D:
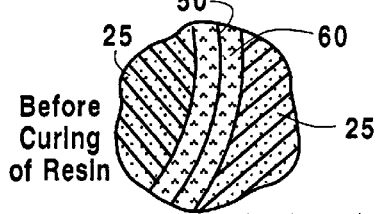
Figure 1E:
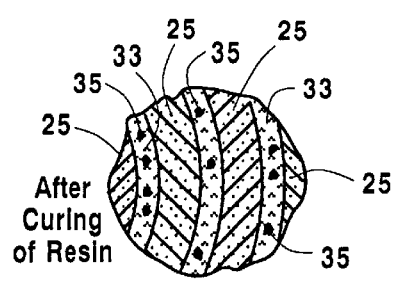
Figure 6:
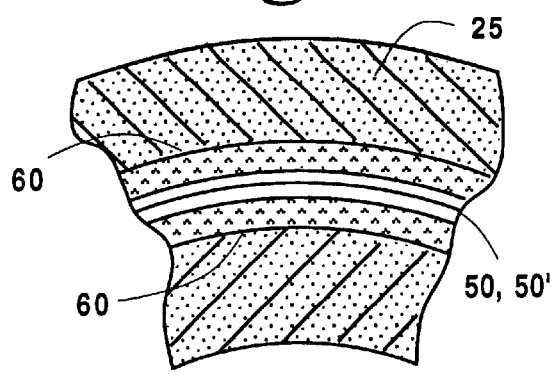
FIG. 6 shows a fragmentary cross-section of a heat shield of this invention prior to cooling.
Figure 3:
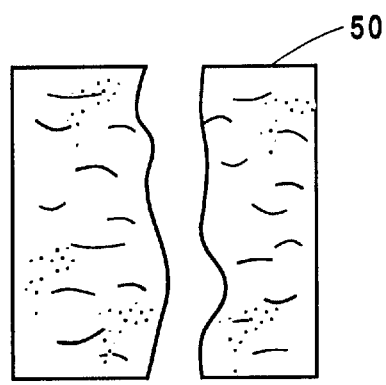
FIG. 3 and FIG. 4 show sheets of heat decomposable carbon-based material for use in the present invention.
Figure 4:
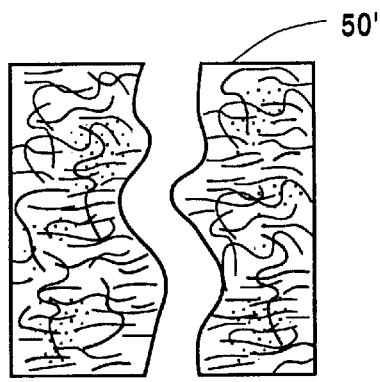
Figure 5:
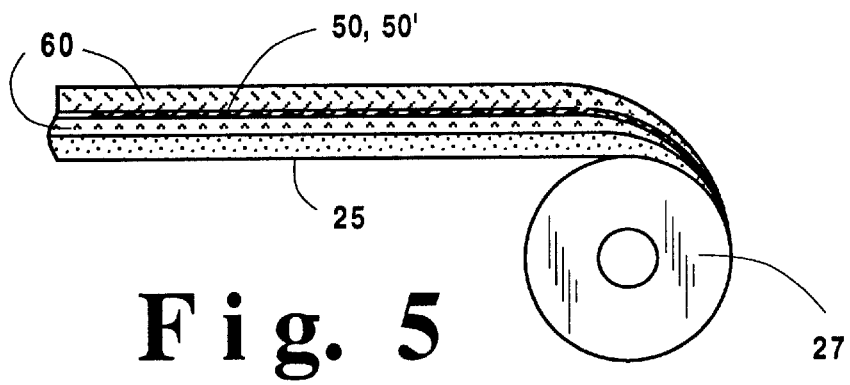
FIG. 5 shows, schematically, the forming of a heat shield in accordance with the present invention.

With reference to FIGS. 1(C), 1(D), a thin sheet of heat decomposable carbon based material, such as Kraft paper as shown at 50 in FIG. 3, or preferably carbon fiber tissue as shown at 50' in FIG. 4, is spiral wound with the anisotropic flexible graphite sheet 25 on mandrel 27 as shown in FIG. 5. The thin, heat decomposable carbon based sheet 50, 50', co-extensive with flexible graphite sheet 25, is coated on both sides with liquid phenolic resin 60 as shown in FIG. 6. The spiral wound article, before curing of the resin, is shown in FIG. 6. Curing of the phenolic resin 60 is accomplished by heating the spiral wound article 20 at 125° for 16 hours and 300° for 16 hours. In the course of curing, the carbon base heat decomposable sheet 50, 50' is gradually reduced to small, trace particles of carbon char (35 in FIGS. 1(B), 1(E) while the gases which evolve from the curing of the resin 60, and the charring of carbon-based sheet 50, escape from the spiral wound article 20 through a temporary channel created by the decomposing of sheet 20 and thus do not cause any delamination of the flexible graphite sheet in the spiral wound article 20. Also, the decomposition of the heat decomposable sheet into small, isolated trace particles of carbon enables the complete, co-extensive phenolic resin bonding of the spiral wound flexible graphite sheet as shown in FIG. 1(E).

The resulting shell is rigid, strong and resistant to corrosion from high temperature chemically active gases in a reducing atmosphere, and the cured resin bonding does not diminish the thermal properties of the spiral wound shell.

Figure 7:
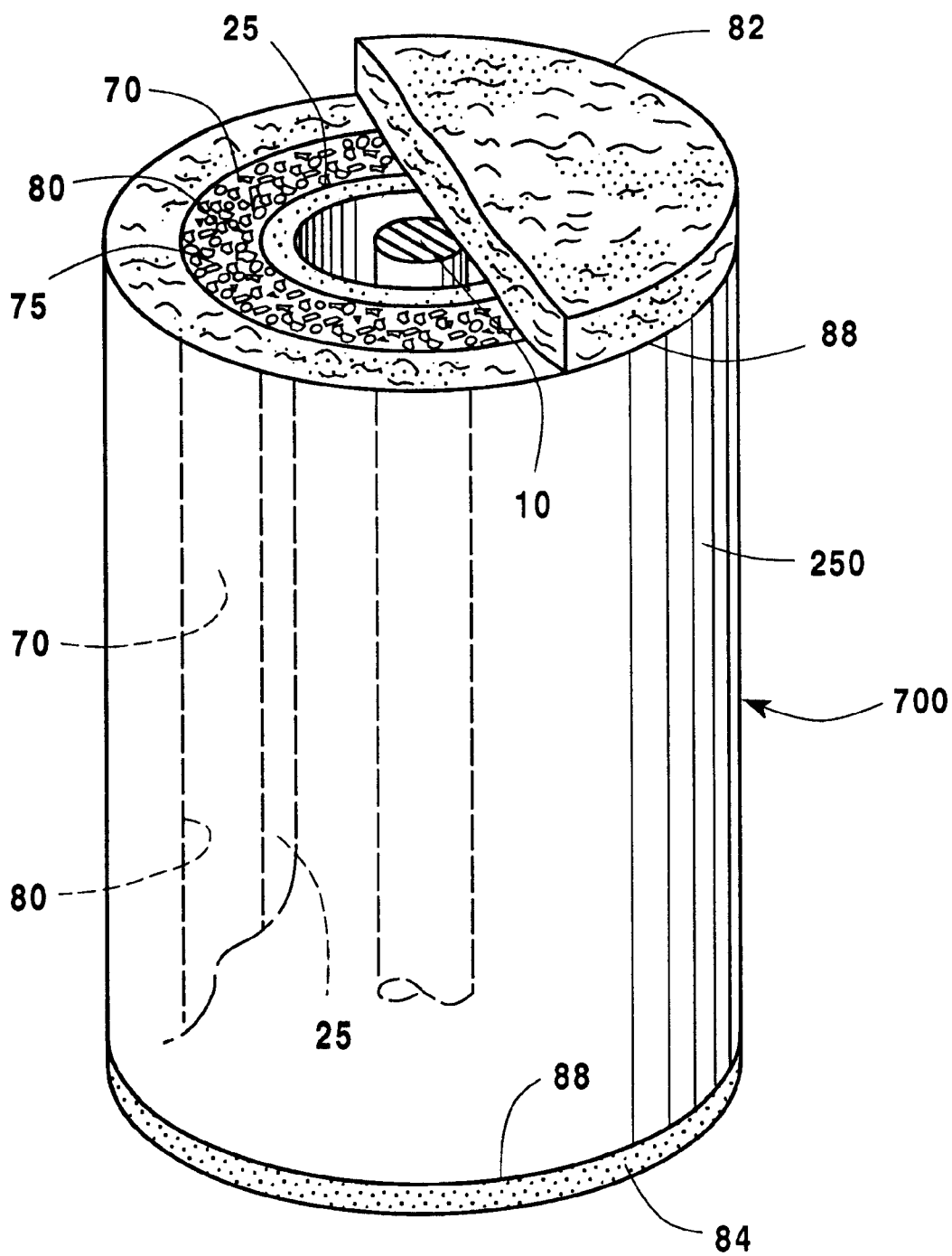
FIG. 7 shows a perspective view of a further embodiment of the present invention.
Figure 8:
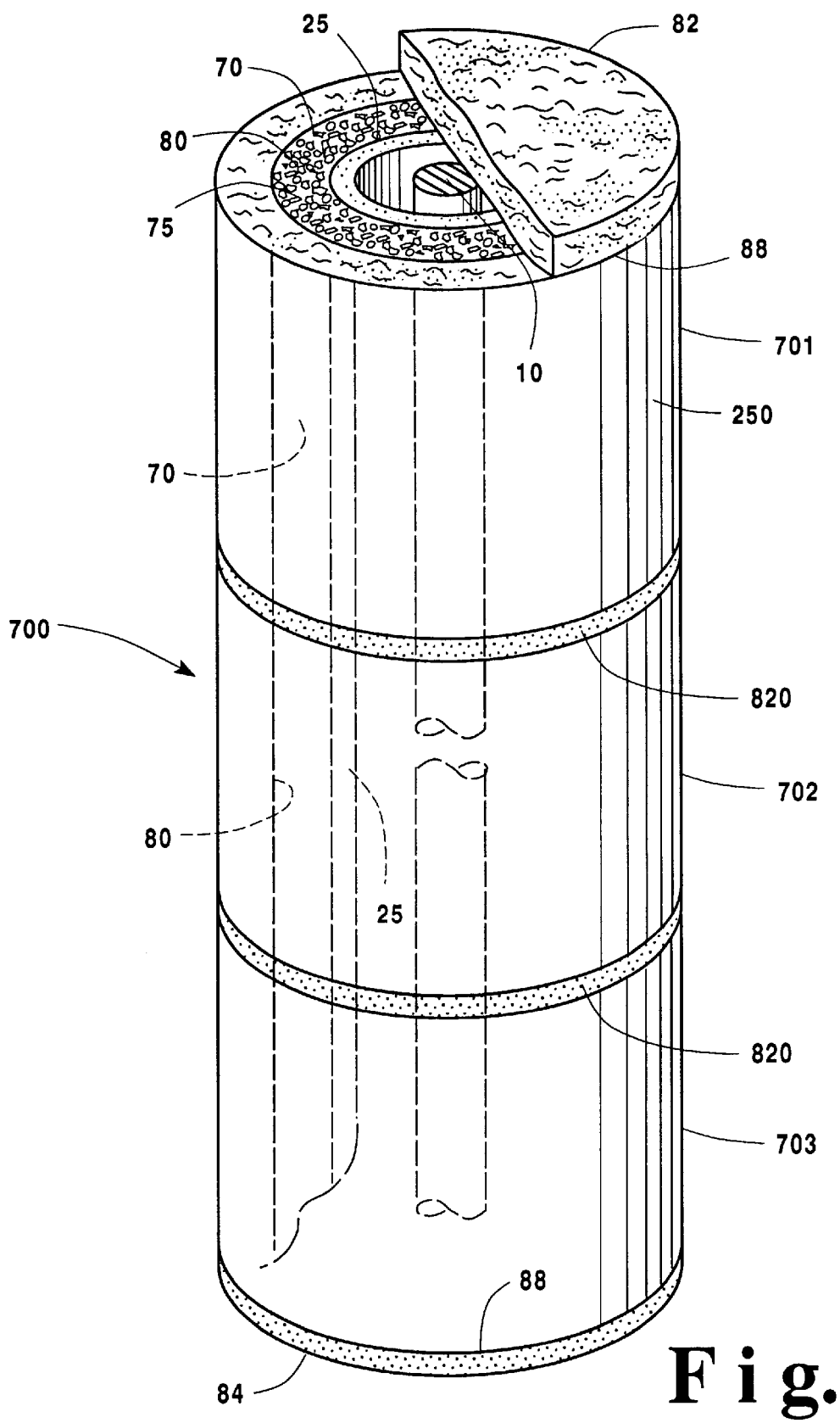
FIG. 8 shows a multi-section heat shield in accordance with the present invention.

In a further embodiment of the present invention, illustrated in FIG. 7, a second spiral wound shell 250, identical to the shell 25, except for having a larger cross section, surrounds shell 25, forming an annular chamber 70 therebetween which is filled with individual particles 75 of uncompressed expanded graphite. These uncompressed particles of expanded graphite receive thermal energy by conduction from the inner shell 25 which is diffused throughout annular chamber 70; any radiant energy from inner shell 25 is likewise diffused by the particles of expanded graphite 75 and reflected by the inner wall 80 of shell 250. The resulting article 700 uniformly reflects radiant thermal energy back to reactor 10 and maintains an even temperature profile despite surges in heat radiation from reactor 10 while being highly resistant to attack by corrosive gases due to being formed completely from solid carbon components. The top and bottom of hollow annular chamber 70 can be sealed by resin bonded laminated, anisotropic sheets of flexible graphite 82 and 84 which can be in the form of flat plates of the same material as shells 25 and 250, being prepared in planar form in flat molds, and resin bonded, as indicated at 88. Annular chamber 70 can be of multi-section construction having vertically extending sections 701, 702, - - - . Annular plates 820 are provided in the same manner. Laminated annular sheets of roll-pressed, anisotropic flexible graphite 820 are provided to encapsulate annular sections 701, 702, - - - . The rotation of the anisotropic graphite sheet into a perpendicular orientation in sheets 820, as in sheets 82, 84 has dual effects. It allows the encapsulation of the uncompressed expanded graphite particles 75. It also forms individual chambers within the shield. These chambers will reflect any transmitted heat from the inner shell, insulation pack, and outer shell back into the chamber; the overall effect is individual components of this insulation system, which will not transmit thermals throughout the entire shielding system.

In the practice of the present invention a suitable phenolic resin is PHYOPHEN 43703 Phenolic Resin in methanol solvent available from Occidental Chemical Corporation, North Tonawanda, N.Y. The resin is suitably cured by heating at 125° for 16 hours and 300° for 16 hours. Kraft paper can be used as the heat decomposable, carbon based substrate 50. The substrate 50' can be a PAN carbon fiber tissue or pitch fibre tissue available from Technical Fibre Products Limited, Cumbria, England.

What is claimed is:

1. Thermal insulating device comprising:

(i) a first hollow, self-supporting cylindrically shaped, vertically extending shell for use as a heat shield surrounding a radiant heat source, said shell being in the form of multiple layers of a spiral wound roll-pressed anisotropic sheet of graphite separated by and bonded to an in situ cured phenolic resin coated on both sides of a sheet of heat decomposable carbon based material co-extensive with said spiral wound sheet of graphite, said heat decomposable sheet of carbon based material providing a porous carbon network path for the escape of gases, produced in the course of in situ curing of the phenolic resin, between spiral wound sheets of graphite and also enabling contact between resin on both sides of the sheet of carbon based material after the in situ curing of the phenolic resin;

(ii) a second vertically extending shell essentially identical to said first shell except for being larger in cross-section, said second shell surrounding said first shell to define an annular chamber therebetween; and (iii) individual uncompressed particles of expanded graphite essentially filling said annular chamber.

2. Thermal insulating device in accordance with claim 1 wherein said hollow cylindrically shaped vertically extending shell is closed at its upper and lower ends by first and second flat plates formed of multiple layers of roll-pressed anisotropic graphite sheet.

3. Thermal insulating device in accordance with claim 1 wherein said annular chamber is closed at its upper and lower ends by first and second flat plates formed of multiple layers of roll-pressed anisotropic graphite sheet.

4. Thermal insulating device in accordance with claim 3 wherein said annular chamber comprises a plurality of vertically extending sections separated by flat annular plates formed of multiple layers of roll-pressed anisotropic graphite sheet.

* * * * *